(12) United States Patent
Brundisini

(10) Patent No.: US 6,240,336 B1
(45) Date of Patent: May 29, 2001

(54) CONTROL UNIT FOR AN IRRIGATION SYSTEM

(75) Inventor: Andrea Brundisini, Pordenone (IT)

(73) Assignee: Claber S.p.A., Fiume Veneto (IT)

( * ) Notice: Subject to any disclaimer, the term of this patent is extended or adjusted under 35 U.S.C. 154(b) by 0 days.

(21) Appl. No.: 08/846,209

(22) Filed: Apr. 28, 1997

(30) Foreign Application Priority Data

Apr. 29, 1996 (IT) .................................................. MI960083

(51) Int. Cl.[7] .............................. G05D 11/00; G05D 7/00
(52) U.S. Cl. .............................. 700/284; 700/14; 700/16; 700/275; 700/282; 700/287; 700/289; 700/302; 239/63; 239/67; 239/70; 239/69; 239/436
(58) Field of Search ..................... 239/67–70, 63, 239/436; 700/284, 287, 282, 289, 302, 275, 11, 14, 16

(56) References Cited

U.S. PATENT DOCUMENTS

| | | | |
|---|---|---|---|
| 4,082,117 | * | 4/1978 | Peckham ............................. 137/870 |
| 4,209,131 | * | 6/1980 | Barash et al. ......................... 239/68 |
| 4,760,547 | * | 7/1988 | Duxbury ............................... 239/69 |
| 4,807,664 | * | 2/1989 | Wilson et al. ........................ 239/69 |
| 4,809,910 | * | 3/1989 | Meyer .................................... 239/1 |
| 4,838,310 | * | 6/1989 | Scott et al. ............................ 239/69 |
| 4,917,304 | * | 4/1990 | Mazzei et al. ........................ 239/69 |
| 4,937,746 | * | 6/1990 | Brundisini ........................... 364/420 |
| 5,173,855 | * | 12/1992 | Nielsen et al. .................. 364/528.19 |
| 5,246,164 | * | 9/1993 | McCann et al. ....................... 239/11 |
| 5,386,360 | * | 1/1995 | Wilson et al. ....................... 364/146 |
| 5,444,611 | | 8/1995 | Woytowitz et al. ................... 700/16 |
| 5,446,473 | * | 8/1995 | Nielsen .............................. 343/890 |
| 5,465,904 | * | 11/1995 | Vaello ................................... 239/69 |
| 5,479,338 | | 12/1995 | Ericksen et al. ...................... 703/16 |
| 5,621,669 | * | 4/1997 | Bjornsson ............................. 702/85 |
| 5,625,569 | * | 4/1997 | Trimmer et al. ............... 364/528.21 |
| 5,740,031 | * | 4/1998 | Gagnon ................................. 239/69 |
| 5,748,466 | * | 5/1998 | McGiven et al. ................... 364/146 |
| 5,884,224 | * | 3/1999 | McNabb et al. ........................ 702/2 |
| 5,956,248 | * | 9/1999 | Williams et al. ..................... 700/16 |

FOREIGN PATENT DOCUMENTS

| | | |
|---|---|---|
| 41 03 420 A1 | 9/1991 | (DE) . |
| 41 22 371 | 1/1993 | (DE) . |
| 0 126 916 | * 12/1984 | (EP) . |
| 0 652 502 A1 | 5/1995 | (EP) . |

* cited by examiner

Primary Examiner—William A. Cuchlinski, Jr.
Assistant Examiner—McDieunel Marc
(74) Attorney, Agent, or Firm—Nixon & Vanderhye P.C.

(57) ABSTRACT

A control unit for an irrigation system comprising a programmable electronic control unit having a plurality of output control lines for the control of actuators of the irrigation system and comprising a microprocessor for setting data that condition the operation of the control unit. The microprocessor is operable to allow a standard programming of the electronic control unit for setting data suitable for allowing the base operation of the control unit, and an advanced programming for setting further data suitable for customizing the base operation of the control unit.

18 Claims, 2 Drawing Sheets

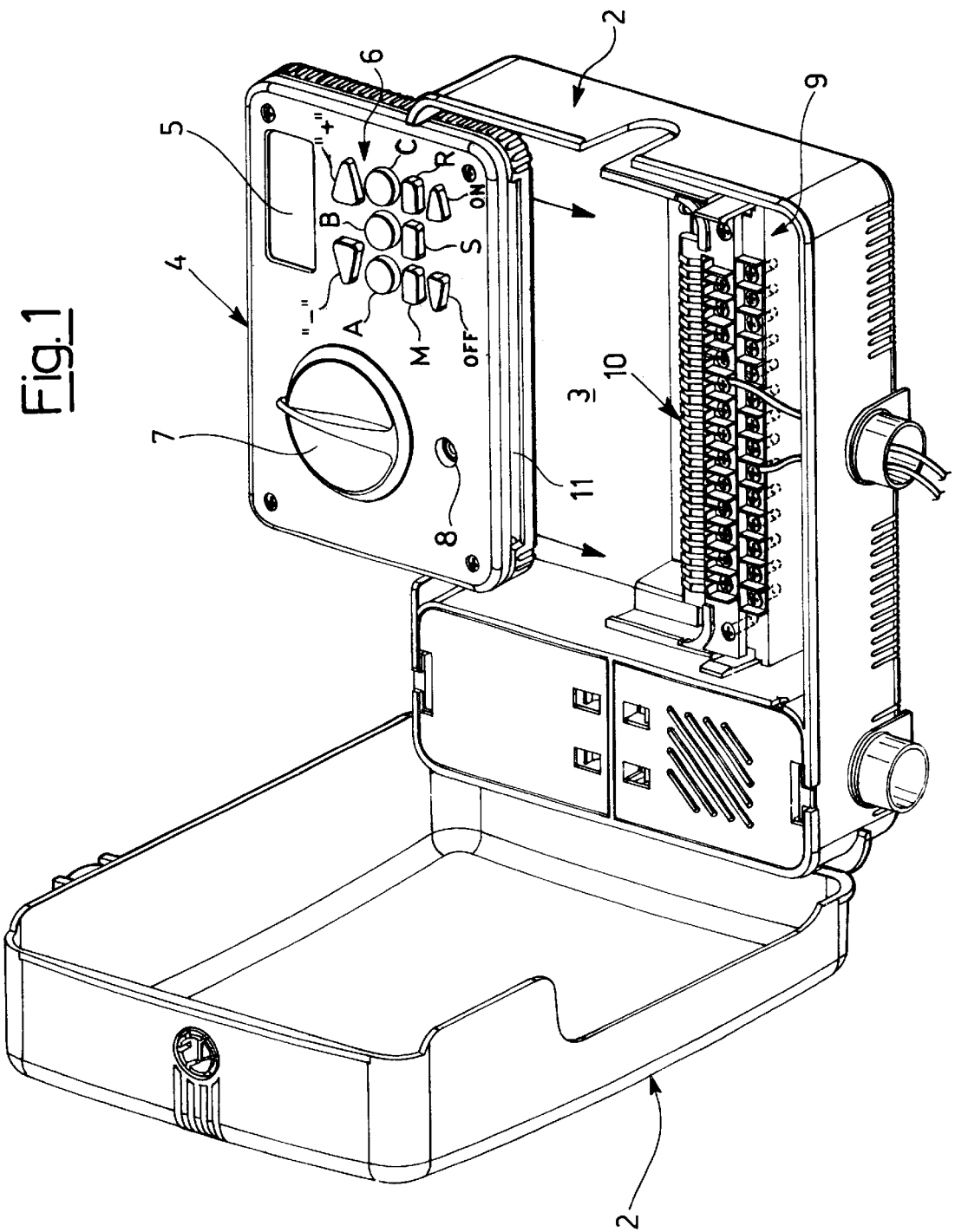

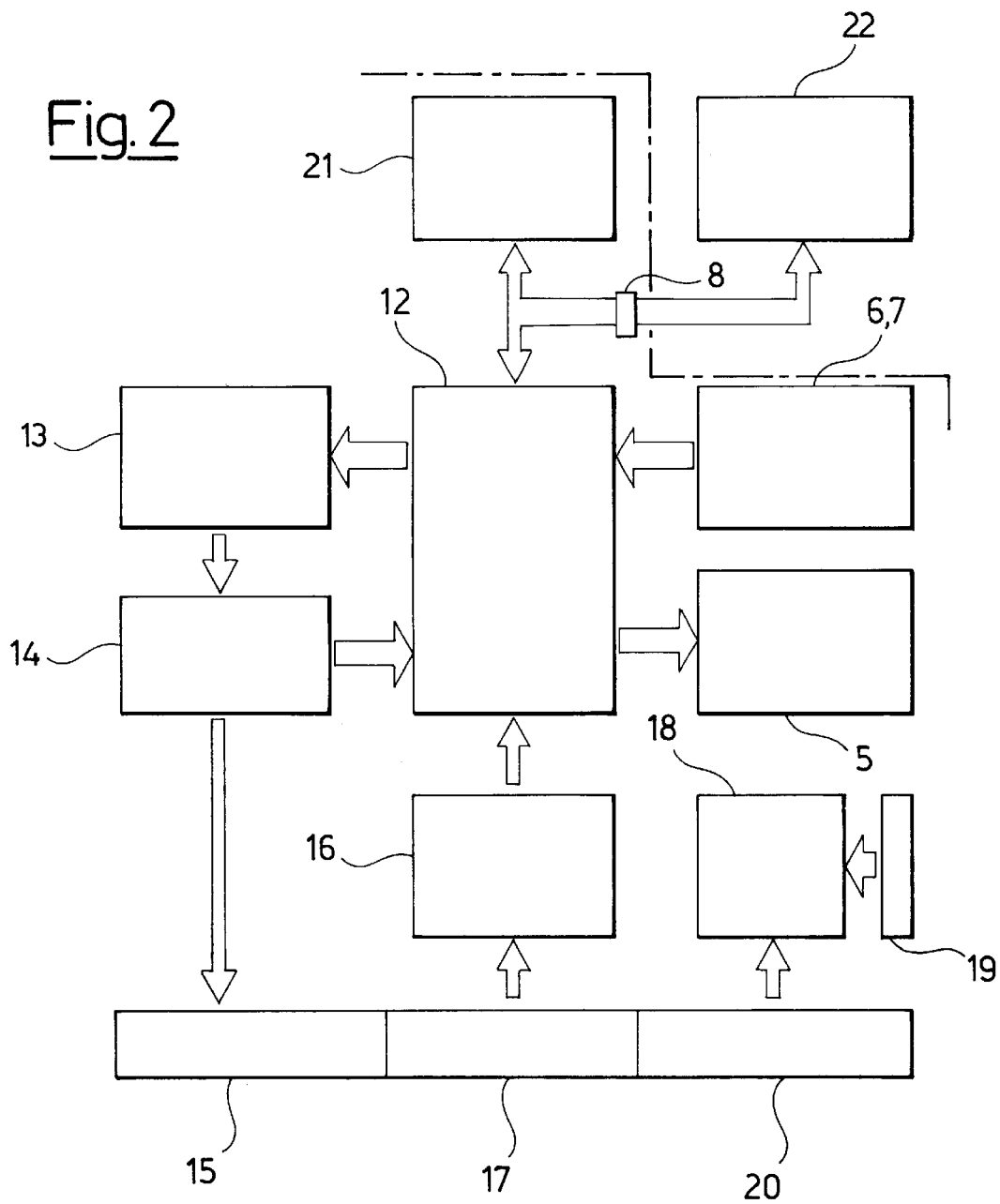

CONTROL UNIT FOR AN IRRIGATION SYSTEM

BACKGROUND

I. Field of the Invention

The present invention relates to a control unit for an irrigation system.

II. Discussion of Prior Art

In the gardening sector automated irrigation systems are known that base their operation on electronic control units.

The control units have become increasingly sophisticated, allowing ever more flexible and customizable controls.

However, with the increase in their performances, the control units have become increasingly more complicated to use, since even the more frequently used functions are inevitably made more complicated.

SUMMARY OF THE INVENTION

In view of the state of the art, the object of the present invention is to provide a control unit for irrigation systems that allows more flexible, accurate and customisable controls without, on the other hand, being more difficult in its use, at least as regards the more frequently used functions. According to the present invention, such object is achieved thanks to a control unit for an irrigation system, comprising a programmable electronic control unit having a plurality of output control lines for the control of actuators of the irrigation system and comprising programming means for setting data that condition the operation of the control unit, characterized in that said programming means are operable to allow a standard method of programming of said electronic control unit for setting data suitable for allowing the base operation of the control unit, and an advanced method of programming for setting further data suitable for customizing the base operation of the control unit.

A control unit according to the present invention is simple to use, thanks to the fact that it has two distinct methods of programming: it is thus possible to separate the functions of more frequent use, related among other things to the setting of base data for the operation of the control unit, from the more advanced functions to achieve more sophisticated and customized controls.

BRIEF DESCRIPTION OF THE DRAWINGS

These and other features and advantages of the present invention will be made more evident by the following detailed description of an embodiment thereof, illustrated as a non-limiting example in the enclosed drawings, wherein:

FIG. 1 is a perspective view of a control unit according to the present invention for the control of an irrigation system;

FIG. 2 is a block diagram of a control unit of the unit of FIG. 1.

DETAILED DESCRIPTION OF THE DRAWINGS

With reference to the drawings, there is shown a control unit for an irrigation system according to the present invention.

The control unit comprises a box-like case or shell 1 endowed with a cover 2 and inside which there is obtained a space 3 for housing, with the possibility of extraction, a control unit 4.

The control unit 4 comprises a display 5, preferably of the liquid crystal type, a keyboard 6 and a rotary selector 7.

The keyboard 6 comprises ten keys, indicated with "+", "−", A, B, C, M, S, R, OFF and ON, whose function will be described later.

The rotary selector 7 can assume a plurality of angular positions, which will also be described later.

On the front of the control unit there is also provided a socket 8 for a plug (not shown), for connecting the control unit 4 to external units.

Inside the shell 1 there is inserted an integrated unit 9 of terminal board and connector, comprising a terminal board with a twin set of terminals and an electrical connector 10 suitable for insertion in an opening 11 in the front vertical wall of the control unit. Electrical wire conductors can be connected to the terminals of the terminal board for driving solenoid valves, pumps and for the possible connection to external sensors. With each terminal there is associated a respective electrical contact of the connector 10.

FIG. 2 is a block diagram of the control unit 4. It comprises a data processing unit 12 with a microprocessor; the latter comprises in a manner known in itself an internal non-volatile memory (ROM, EPROM or EEPROM) wherein there is stored the firmware that determines the operations executed by the microprocessor, and an internal dynamic memory (RAM) wherein there are stored the data related to the irrigation programs in execution. The microprocessor 12 is connected through a signal line bus to an internal non-volatile memory 21 for saving the data related to irrigation programs (that will be described later). The microprocessor 12 drives the display 5, and is connected to the keyboard 6 and to the rotary selector 7 so as to detect the pressure of the push-buttons of the former and the angular position of the latter.

The microprocessor 12 also controls a driving circuit 13 of a group of output lines 15 of the control unit 4, lines that through the connector 10 and the terminal board, are connected to respective actuators (for example, solenoid valves) to an irrigation system (not shown). With the output lines of the group 15 there is associated a circuit for the detection of short circuits 14, suitable for detecting the presence of defects on said lines, such as, for example, a short circuit; the circuit for the detection of short circuits 14 is connected to the microprocessor 12 so as to tell the latter that such defects have occurred.

There is also a detection circuit 16, supplied by signals from external sensors through a group of input lines 17 that, through the connector 10 and the respective terminal board, can be connected to external sensors (not shown). The sensor detection circuit 16 is connected to the microprocessor 12.

There is also shown a supply circuit 18 that is connected to a source of external supply through respective supply lines 20; typically, the external supply is a supply at 24VAC or at 12VAC; a battery 19, however, is provided for supplying the various circuits during the interruptions of the external supply, and in order to save the data in the dynamic memory of the microprocessor 12. The battery can be an ordinary 9V alkaline battery, that can ensure the saving of the stored data for about 15 days, or a 9V Ni—Cd accumulator, that, however, can ensure a more limited permanence of the data in the memory, equal to about 15 hours.

Lastly, there is also shown an external unit 22 that can be connected to the control unit 4 by means of a plug that can be inserted in the socket 8.

The operation of the control unit will now be illustrated.

The control unit according to the present invention can control in an automatic manner a plurality of actuators, for example solenoid valves, of an irrigation system; in the example of an embodiment that is described, the number of such actuators is fifteen. The fifteen actuators can be controlled according to a plurality of independent irrigation programs, in the example described three.

The control unit has two methods of programming: a standard method of programming, wherein it is possible to set the basic data for the operation of the control unit itself, and an advanced method that allows finer controls and a greater degree of customization of the functions of the control unit itself.

The base data for the operation of the control unit are: the day of the current week, the current time, the daily periods of operation of the three irrigation programs (program A, program B and program C); as will be seen later, in the standard method further operations are in any case also possible.

In order to set the current time, the rotary selector 7 is rotated to a first position; there is shown on the display the value of the current time currently stored. By pressing the push-buttons "+" and "−" it is possible to change the value of the current time stored in the dynamic memory of the microprocessor.

In order to set the current day of the week, the rotary selector is rotated to the second position; there is shown on the display the current day the week currently stored. By pressing the push-buttons "+" and "−" it is possible to change the value of the current day stored in the dynamic memory of the microprocessor 12.

In order to set the irrigation programs, it is necessary first of all to press one of the three push-buttons A, B or C of the keyboard, according to whether program A, program B or program C is to be set. Once the program has been selected, it is necessary to select the days of the week on which the selected program is to activate the irrigation: for this purpose, the rotary selector is rotated to an angular position corresponding to a given day of the week on which the irrigation is to be activated, and then the push-button "+" of the keyboard is pressed to enable the activation of the irrigation on that particular day of the week; if on one or more days of the week the activation of the irrigation is not to be enabled, it will be sufficient, once the selector is rotated to the position corresponding to that day of the week, to press the push-button "−" of the keyboard. The operation is repeated for all seven days of the week, rotating the selector in succession to the seven positions corresponding to the days of the week.

The control unit allows the definition, for each irrigation program A, B and C, of three periods of irrigation every day. Once the days of the week on which the irrigation is to be enabled have been selected, in order to set the time on which to start the three daily periods of irrigation the rotary selector is rotated to an angular position corresponding to the daily period of irrigation selected: there will be shown on the display the starting time of the period of irrigation; by pressing the push-buttons "+" and "−" it is possible to change such starting time. If a given period of irrigation among the three that are available is to be disabled, it will be sufficient, once the rotary selector has been rotated to the position corresponding to that period of irrigation, to press the push-button "+" or "−" until the message OFF appears on the display. The same operations are repeated in order to enable or disable the other two daily periods of irrigation.

The possibility can also be provided, at the end of the normal irrigation programs, to activate, together with a stop of the programs themselves, a timer that, after arriving at a prefixed time, drives the restart of the programs A, B, C thus obtaining a cyclical process.

It is then necessary to select which of the output lines of the control unit are to be controlled by the irrigation program that is being set. For this purpose, the rotary selector has fifteen angular positions, each corresponding to one of the fifteen output lines. Rotating the selector to one of these fifteen positions, there will appear on the display the duration of the individual period of irrigation for that given output line; by pressing the push-buttons "+" and "−" it is possible to change the value of such duration. Preferably, the display 5 will show the duration that is being set, in addition to the numerical form (in hours and minutes), also in a pseudo-analogical form, by means of a number of segments proportional to the set duration: for example, if one segment is lit up this can correspond to five minutes of activation. This operation must be repeated for all the fifteen output lines. If one or more output lines are not to be activated in that irrigation program, it is sufficient, once the selector has been rotated to the angular position associated with that output line, to press the push-button "+" or "−" until the message OFF appears on the display.

In this way it is possible to set the three irrigation programs: it is possible to select which output lines are to be driven by each program, to select on which days of the week the irrigation is to be activated, to set up to three periods of irrigation every day, and to set, individually for each output line, the duration of the irrigation in the three abovementioned periods.

In operation, the microprocessor 12 will activate the output lines of the control unit according to the irrigation programs that have been set and selected from time to time by means of the push-buttons A, B, C, so as to determine the automatic opening and closing of the solenoid valves of the irrigation system.

In addition to the automatic control according to the irrigation programs that have been set, the control unit allows a so-called manual method of operation, wherein it is possible to control in an extemporaneous manner the timed opening of a preselected solenoid valve by means of the activation of the respective output line: for this purpose, the rotary selector must be rotated to the position corresponding to the output line that is to be controlled manually, and it is then necessary to press the push-button M, to press the push-buttons "+" or "−" in order to define the duration of the period of manual opening of the solenoid valve associated with the abovementioned output line, and lastly to press the push-button ON to operate the manual opening of the solenoid valve; the display will show, with a decreasing countdown, the time remaining before the solenoid valve is closed. The manual opening can be interrupted even before the set time has elapsed, by pressing the push-button OFF. It is possible to exit from the manual method of operation by pressing the push-button M again.

The control unit also allows, in an extremely simple but advantageous manner, to avoid or to interrupt the irrigation on the days when it rains. More accurately, two different methods are allowed for the immediate deactivation of all the output lines controlling the solenoid valves of the irrigation system: the first method allows a permanent deactivation of the output lines controlling the solenoid valves; in order to activate this method it is necessary to press the push-button R; on the display there will appear the message "ALL OFF", that indicates to the user that all the solenoid valves are closed. In order to deactivate this method of programming and to reactivate all the output lines, it is sufficient to press the push-button R again. The second method allows the outputs to be deactivated for a pre-set interval of time (the control unit is placed in a state of so-called pause); in order to activate this method the push-button R is pressed again, this determines as described above the deactivation of all the control outputs. When the push-buttons "+" and "−" are then pressed the period, variable for example from 1 to 31 days, is then set during which the outputs will remain deactivated; at the end of this period of time, the outputs will be enabled again, and their activation will again follow the irrigation programs that have been set. In order to exit from this method of operation before the abovementioned time period has elapsed it is sufficient to press the push-button R again.

It is also possible to activate one of the three irrigation programs at pre-set intervals of time, setting the frequency of execution of the irrigation program. For this purpose it is necessary to rotate the rotary selector to a specific angular position (that will, for example, be indicated with "CYCLE"), and to press one of the push-buttons A, B or C of the keyboard in order to select the irrigation program that is to be subjected to cyclic activation. The push-buttons "+" or "−" are then pressed to set the number of days that will constitute the cycle: when the cycle has come to an end, the irrigation program will be executed. When the selector is then rotated to the same position used for setting the current day, and by pressing the push-buttons "+" or "−" it is possible to set the number of days, starting from the current date, after which the cyclic operation will be activated. The selector is then rotated to the angular position corresponding to the output line for which the cyclic irrigation is to take place, and by pressing the push-buttons "+" and "−", the duration of the period of irrigation is set. Then the selector is rotated to the position indicative of the first daily period of irrigation, and by means of the push-buttons "+" and "−" the time at which the irrigation is to start is set. The same thing can be done for the two remaining daily periods of irrigation, so as to allow up to three daily openings for each output line.

The control unit also allows a "semi-automatic" method of operation, wherein it is possible to activate in an extemporaneous manner a given irrigation program among the three that are available (program A, program B and program C) that have been set earlier. To do that, the push-button S is pressed, and the push-button related to the desired irrigation program (A, B or C) is then pressed. Then the push-button ON is pressed, to start the execution of the irrigation program. If the execution of an irrigation program is to be interrupted ahead of time, it is sufficient to press the push-button OFF. In order to exit from the semi-automatic method of operation, it will be sufficient to press the push-button S again.

Again in the standard method, a function is made available that allows the monitoring of the state of the various output control lines, in order to obtain information such as the outputs currently activated, the residual time of the current period of irrigation, the defect conditions, if any, in the operation of the actuators (for example, active probes). In order to access such information, it is necessary to rotate the selector to a specific angular position, wherein the display will show the information related to the state of the first line currently activated and the irrigation program with which such line is associated. By repeatedly pressing the push-button ON the information related to the other active lines will be displayed. Once the information related to a given currently activated line is displayed, it is also possible to deactivate it immediately, interrupting the irrigation currently under way, by pressing the push-button OFF.

In order to access the advanced method of programming, it is necessary to rotate the selector to a particular angular position (identified for example by the indication "EXPERT"), and then to press the push-button ON in order to scan the further functions that can be programmed; the latter will be shown in sequence on the display.

A first possibility offered by the advanced method of programming consists in the selection of the language wherein the messages are displayed; the possible languages are for example Italian, English, French and Spanish; this function is accessed, after rotating the rotary selector to the "EXPERT" position, by repeatedly pressing the push-button ON until the message identifying the currently selected language appears on the display, and by pressing the push-buttons "+" or "−" until the message identifying the currently selected language is exhibited on the display.

Another possibility offered by the advanced method of programming consists in the selection of the format in which the current time is displayed (AM-PM format or 24-hour format); this function is accessed, after rotating the selector to the "EXPERT" position, by repeatedly pressing the push-button ON until the message corresponding to the currently selected format appears on the display ("24:00" or "AM:PM"); by pressing the push-button "+" or the push-button "−" it is possible to switch from one format to the other.

Another possibility offered by the advanced method of programming consists in the possibility of changing, in a manner independent for each of the three irrigation programs, the unit of temporal measurement from the standard form hours-minutes to minutes-seconds, to allow a finer programming of the durations of the periods of irrigation. In order to activate such function, after rotating the selector to the "EXPERT" position, it is necessary to press the push-button ON repeatedly until the message "HH:MM M:S" appears on the display; at this point it is necessary to select the program with which the unit of temporal measurement is to be associated, by pressing one of the push-buttons A, B or C. Lastly, by pressing the push-button "+" or the push-button "−", it is possible to switch between the two units of temporal measurement.

Another possibility offered by the advanced method of programming consists in the possibility of adapting the duration of the periods of irrigation to the changed climatic conditions: more precisely, it is possible to increase up to 150% or to decrease down to 10% the durations of the periods of irrigation of a given program previously set and resident in the dynamic memory of the microprocessor. In order to execute this, after having rotated the selector to the "EXPERT" position, it is necessary to press one of the push-buttons A, B or C in order to select the irrigation program of which the durations of the periods of irrigation are to be changed, and then to press the push-buttons "+" or "−" in order to make percentage changes to the duration of the periods of irrigation of that program. The operation can be repeated for the other two programs.

Another possibility offered by the advanced method of programming consists in the possibility of introducing a delay in the successive activation of the solenoid valves, with the object of allowing the water system to reach an adequate level of pressure. In order to activate this function, after having rotated the selector to the "EXPERT" position, it is necessary to press the push-button ON repeatedly until the message "OFF MS" appears on the display. The irrigation program is then selected for which a delay is to be inserted between the closing of one solenoid valve and the subsequent opening of another solenoid valve, and the push-buttons "+" or "−" are then pressed in order to set the desired delay, expressed in minutes and seconds.

Another possibility offered by the advanced method of programming consists in the possibility of checking for the presence of any defects in the actuators of the solenoid valves, typically short circuits. For that purpose, after having rotated the selector to the "EXPERT" position, it is necessary to press the push-button ON repeatedly until the message "SHRT" appears on the display, with the indication, if any, of the lines on which the presence of a short circuit has been detected (a detection that is carried out by the circuit 14 and that is reported to the microprocessor 12).

Another possibility offered by the advanced method of programming consists in the possibility of resetting the control unit, resetting the data set manually. After having rotated the selector to the "EXPERT" position, it is necessary to press the push-button ON repeatedly until the message "RES" appears on the display; keeping the push-button "+" pressed for more than 10 seconds, the microprocessor 12 is reset; after a reset operation, all the data will assume a default configuration provided by the manufacturer.

Another possibility offered by the advanced method of programming consists in the possibility of executing a test of the control unit, something useful especially during the step of installation of the irrigation system. In order to access this function, after having rotated the selector to the "EXPERT" position, the push-button ON is pressed until the message "1:00 T M:S" appears on the display. The push-buttons "+" and "−" are then pressed to set the duration of a test activation of the output lines. By pressing the push-button M a sequential opening of all the outputs is then started, with a given delay (for example, 3 seconds) between the closing of one solenoid valve and the opening of the subsequent one).

Again in the advanced method of programming it is also possible to set the maximum number of solenoid valves that can be active simultaneously. It is possible to select a maximum number equal to just one solenoid valve, or to three solenoid valves open simultaneously. To do that, after moving the selector to the "EXPERT" position, the push-button ON is pressed repeatedly until the message "1-ST" appears on the display, corresponding to a maximum of one solenoid valve open at a time. By pressing the push-buttons "+" or the push-button "−" it is possible to select a maximum of three solenoid valves open simultaneously.

It is also possible, again in the advanced method of programming, to select one of two different methods of operation of the control unit, denominated "mechanical method" or "electronic method", respectively. The difference between the two methods consists in the different behaviour of the control unit in the case of an interruption of the electrical energy. In the mechanical method, the period of irrigation under way at the moment when the supply is interrupted is completed when the latter is restored, in a manner similar to that of operation of an electromechanical programmer; in this way the execution of an entire period of irrigation is privileged over the observance of the time. In the electronic method, on the other hand, in case the supply is interrupted the time during which the supply is absent is subtracted from the duration of the period of irrigation. In order to select one of the two abovementioned methods of programming, after rotating the selector to the "EXPERT" position, the push-button ON is pressed until the message "MEC" (=mechanical) or "ELE" (electronic) appears on the display. By pressing the push-button "+" or "−" it is possible to switch from one method of programming to the other.

The control unit also allows the driving of a relay of an electric pump or of a general valve of the irrigation system; the corresponding output control line is one of the lines of the group 15 of FIG. 2. To do that, the selector is rotated to the "EXPERT" position, the push-button ON is pressed until the message "MV" appears on the display and one or more of the push-buttons A, B or C is pressed to select the program with which to associate the activation of the output line of the control unit associated with the general valve.

As mentioned earlier, external sensors can also be associated with the control unit to detect certain environmental conditions; the sensors can, for example, be sensors of humidity, of rain, of delivery of the hydraulic system of water level in a tank. In the embodiment described, the control unit is endowed with three input lines (group 17 in FIG. 2) for the connection of three sensors. With each of the three input lines it is possible to associate four different functions: a so-called "Start" function to determine the start of the execution of an irrigation program independently of the days and of the daily periods set for that program: for example, having available a sensor of humidity, it is possible to subject the activation of an irrigation program to the fact that the percentage of humidity be below a given level. A so-called "Stop" function to determine the suspension of the execution of an irrigation program independently of the days and of the times that have been set: for example, having available a sensor of rain, it is possible, in case of rainfall, to suspend the irrigation; a so-called "Skip" function that determines the deactivation of a given output line of the control unit associated with a respective solenoid valve and the activation of the subsequent output control line: for example, having available a delivery sensor, it is possible to detect from the excessive water demand the presence of a leak in the circuit downstream from a solenoid valve, and to deactivate that output line of the control unit; and a so-called "Hold" function to determine the temporary suspension of a period of irrigation in the interval of time wherein, for example, a sensor of level that detects the water level in an accumulation tank detects that the water in the tank has dropped below a pre-set level.

In order to program the use of sensors, the advanced method of programming is used. Rotating the selector to the "EXPERT" position, the push-button ON is pressed repeatedly until, on the display, there appears the flashing message "STRT, ABC" and the indicator "1" that identifies the input line of the control unit associated with the first sensor. By pressing the push-button "+" or "−" it is possible to select, for that sensor, one of the four abovementioned functions: on the display there will appear in sequence the messages "STRT", "STOP", SKIP" and "HOLD". Once the function to be associated with the sensor has been selected, one or more of the push-buttons A, B and C are pressed to activate or deactivate the function selected for the irrigation programs. It is then possible to set the time of permanence in the active state of the input signal activated by the sensor for the signal itself to be considered valid (this allows a filtering to be executed on possible spurious activations): pressing the push-button ON the message "OFF M:S" and the indicator of the input line of the control unit associated with the first sensor appears on the display; by pressing the push-buttons "+" or "−" it is then possible to set the minimum time of permanence. The abovementioned operations must be repeated for the other two sensors. The control unit according to the present invention also allows a dialogue with other external units, that can be connected to the same control unit by inserting a plug in the socket 8.

A first possibility consist in the transfer (saving) of the data related to the three irrigation programs A, B and C in an external memory, by means of an interface terminal to be inserted in the socket 8 (FIG. 1); in this way, it is possible to set the desired programs on one control unit only, and then to reproduce the programs themselves on other control units of the same type. In order to activate this function, it is necessary to place the control unit in the advanced method of programming by rotating the selector to the "EXPERT" position, and to press the push-button ON until the message "TEX" appears on the display. The push-button "+" is then pressed until the message "OK-2" appears on the display, identifying the function of transfer of the data on an external memory; the transfer operation starts in this way; if errors occur during the transfer, the message "ERR" will appear on the display and the operation will have to be repeated.

A second possibility, complementary to the first, consists in the transfer of data from an external memory to the internal memory of the control unit. In this way, it is possible to acquire data, from an interface terminal connected to the socket 8, related to irrigation programs previously set on another control unit, or simply on a control unit 4 endowed with an autonomous electrical battery, and to transfer them from this to the external memory of the interface terminal. In order to activate this function, the selector is again rotated to the "EXPERT" position and the push-button ON is pressed repeatedly until the message "T-IN" appears on the display; the push-button "+" is then pressed until the message "OK-2" appears on the display: the procedure of transferring data from an external memory to the internal memory internal of the control unit starts in this manner, as before, if errors occur during the transfer, the message "ERR" will appear on the display and the operation will have to be repeated.

In a similar manner its is also possible to save the data related to the irrigation programs resident in the dynamic (volatile) memory of the microprocessor 12 in the non-volatile memory 21 of the control unit itself, so that even in the case of an interruption of the mains supply and of exhaustion of the battery the data are not lost. To that end, it is necessary to rotate the selector to the "EXPERT" position, and to press the push-button ON until the message "T-EX" appears on the display; the push-button "+" is then pressed until the message "OK-1" appears on the display, identifying the operation of transferring the data from the dynamic memory of the microprocessor to the internal non-volatile memory 21 of the control unit.

A further possibility offered by the control unit of the present invention consists in the remote operation, wherein the control unit itself can be activated by a remote signal that can for example activate or disactivate the irrigation programs, including the test function, or the individual output lines. The control interface must be connected, by means of a plug, to the front socket 8 of the control unit 4.

In order to activate such method, it is necessary to place the selector in the "EXPERT" position, and to press the push-button ON repeatedly until the message "-REM" appears on the display; the control unit at this point activates a procedure of recognition with the interface terminal, and if the latter is recognised as correct, the message "oREM" is displayed: the control unit will thus operate in a remote mode.

It is also possible to connect in series several control units of the type described, in order to obtain the control of a number of solenoid valves greater than 15 that can be run by the single control unit. Each control unit can be made to operate as a "master" or as a "slave". It is, for example, possible to have one "master" control unit and six "slave" control units. The control unit made to operate as "master" is the only one that can activate an irrigation program, at the end of which it will determine the start of the homonymous irrigation program in the "slave 1" control unit, that will in turn control the "slave 2" control unit, and so on. The only active functions on the "slave" control units are the functions of setting the periods of irrigation for each of the solenoid valves controlled by them. For example, the activation signal of the "slave 1" control unit can be represented by the same activation signal of the last solenoid valve of the "master" control unit, that is received by a sensor of the "slave 1" control unit and through this controls the activation of the latter, in a similar manner the "slave 1" control unit controls the activation of the "slave 2" control unit, and so on.

What is claimed is:

1. An irrigation system control unit comprising:
   a keyboard including at least one first button for selecting standard programs;
   a rotary selector for selecting one of a plurality of angular positions, said angular positions including in a first angular position a selection of valves under control and in a second angular position an indication of days of the week;
   at least a second button operable in combination with said first button and said rotary selector to establish for each program in said selection start-up days, start-up times and working period according to a standard method; and
   said rotary selector including a further angular position in which said selector allows operations of at least a third button for including advanced customized functions in said programs according to advanced programming methods.

2. Control unit according to claim 1, wherein said keyboard further comprises a third push-button for manual irrigation control.

3. Control unit according to claim 1, wherein said keyboard further comprises a fourth push-button for manual stop of an irrigation program.

4. Control unit according to claim 1, wherein said keyboard further comprises a fifth push-button for manual start of an irrigation program.

5. Control unit according to claim 1, wherein said keyboard further comprises push-buttons for starting and stopping irrigation programs.

6. Control unit according to claim 1, wherein said control unit has a plurality of output lines, one of said output control lines is suitable for driving a main valve of the irrigation system.

7. Control unit according to claim 1, wherein said control unit has a plurality of output lines, one of said output control lines is suitable for driving a pump of the irrigation system.

8. Control unit according to claim 1, wherein said control unit comprises a plurality of input lines for the connection of sensors external to the control unit.

9. Control unit according to claim 1, wherein said control unit comprises means for connection to external units.

10. Control unit according to claim 9, wherein said external units comprise an external memory unit, said advanced method of programming comprising a function of transfer of data stored in a memory of the electronic control unit to said external memory.

11. Control unit according to claim 9, wherein said external units comprise an external memory unit, said advanced method of programming comprising a function of transfer of data stored in said external memory to an internal memory of the electronic control unit.

12. Control unit according to claim 9, wherein said means for connection to external units comprise at least one socket provided in the control unit for connection of a cable which connects it to the external unit.

13. Control unit according to claim 9, wherein said means for connection to external units comprise a receiver of electromagnetic waves.

14. Control unit according to claim 1, wherein said unit can be used both as a "master" control unit and as a "slave" control unit in an irrigation system with one "master" control unit and several "slave" control units.

15. An irrigation control unit including a plurality of water valve control output lines, said control unit according to claim 1 comprising:

- a microprocessor, said microprocessor programmed to operate one or more of said plurality of water valve control output lines in accordance with at least one standard irrigation program;
- an input programming device for programming said microprocessor with at least one customized irrigation program; and
- a control for selecting one of said at least one standard irrigation program and said at least one customized irrigation program for implementation by said microprocessor.

16. An irrigation control unit according to claim 15, wherein said input programming device includes a keyboard.

17. An irrigation control unit according to claim 15, wherein said input programming device and said control are comprised by a keyboard and a rotary selector.

18. An irrigation control unit according to claim 17, further including a display for visualization of information provided by said keyboard.

* * * * *

UNITED STATES PATENT AND TRADEMARK OFFICE
CERTIFICATE OF CORRECTION

PATENT NO. : 6,240,336 B1
DATED : May 29, 2001
INVENTOR(S) : Brundisini

Page 1 of 1

It is certified that error appears in the above-identified patent and that said Letters Patent is hereby corrected as shown below:

Title page,
Item [30], Foreign Application Data, should read:
-- Apr. 29, 1996   (IT) .....................MI96A000830 --

Signed and Sealed this

Seventh Day of May, 2002

Attest:

Attesting Officer

JAMES E. ROGAN
Director of the United States Patent and Trademark Office